(12) United States Patent
Sekiguchi

(10) Patent No.: US 6,768,532 B1
(45) Date of Patent: Jul. 27, 2004

(54) LIQUID CRYSTAL DISPLAY PANEL

(75) Inventor: Kanetaka Sekiguchi, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/744,025

(22) PCT Filed: May 19, 2000

(86) PCT No.: PCT/JP00/03237

§ 371 (c)(1),
(2), (4) Date: Jan. 19, 2001

(87) PCT Pub. No.: WO00/72084

PCT Pub. Date: Nov. 30, 2000

(30) Foreign Application Priority Data

May 21, 1999 (JP) .......................................... 11-140893

(51) Int. Cl.[7] .......................... G02F 1/1339; G02F 1/13; G02F 1/1343
(52) U.S. Cl. ............................ 349/153; 349/2; 349/144
(58) Field of Search ............................ 349/2, 144–147, 349/153

(56) References Cited

U.S. PATENT DOCUMENTS

| 4,412,214 A | * | 10/1983 | Tanaka et al. ............... 340/765 |
| 5,963,280 A | * | 10/1999 | Okuda et al. ................. 349/65 |
| 6,342,930 B2 | * | 1/2002 | Ishimaru ..................... 349/144 |

FOREIGN PATENT DOCUMENTS

| CH | 619 792 A5 | 10/1980 |
| EP | 0 552 508 A1 | 7/1993 |
| EP | 0 778 440 A2 | 6/1997 |
| EP | 1 103 841 A1 | * 5/2001 |
| JP | 01304438 | 12/1989 |
| JP | 07072465 | 3/1995 |

* cited by examiner

Primary Examiner—Kenneth Parker
Assistant Examiner—Dung Nguyen
(74) Attorney, Agent, or Firm—Westerman, Hattori, Daniels & Adrian, LLP

(57) ABSTRACT

A liquid crystal display panel fabricated by bonding a first substrate and a second substrate together with a peripheral sealing section, providing a given spacing therebetween. A signal electrode is disposed so as to oppose an opposite electrode, and a liquid crystal layer is sealed in-between the spacing such that a transmittance thereof increases by applying a voltage thereto. The signal electrode is composed of target electrodes, wiring electrodes, and a peripheral electrode, and wiring sealing sections formed of a transparent sealing material are installed in regions where wiring electrodes are opposed to the opposite electrode such that a transmittance of the regions is always substantially equal to that of regions of the liquid crystal layer where a voltage is applied, thereby enabling a transmitting state to occur to the entire area of a display region in a condition wherein no voltage is applied.

20 Claims, 11 Drawing Sheets

F I G. 6
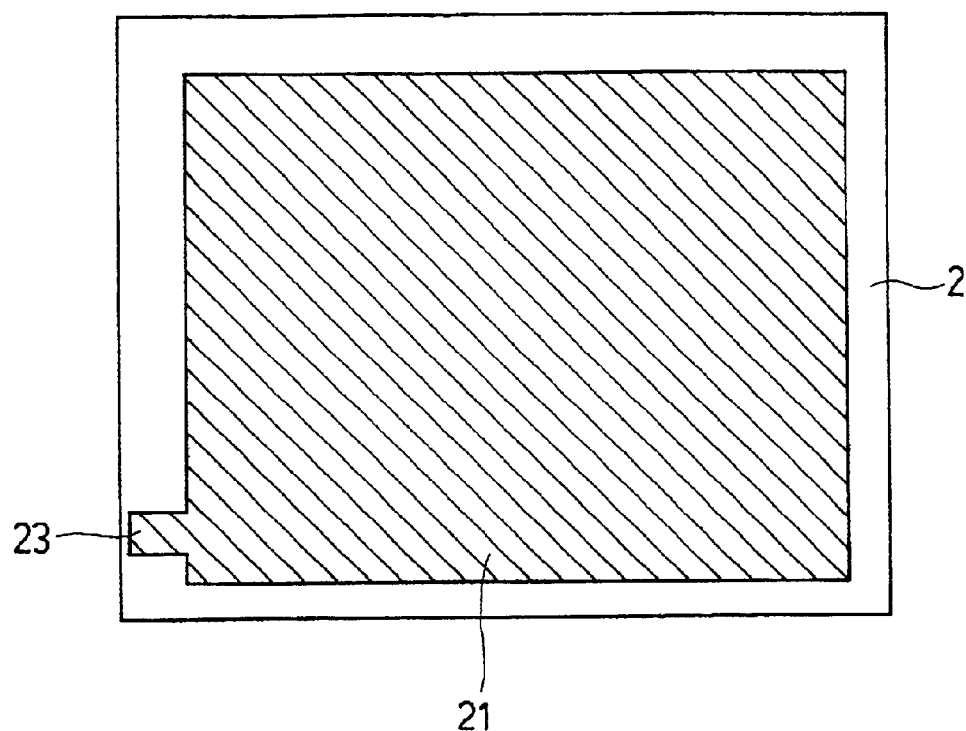

F I G. 9
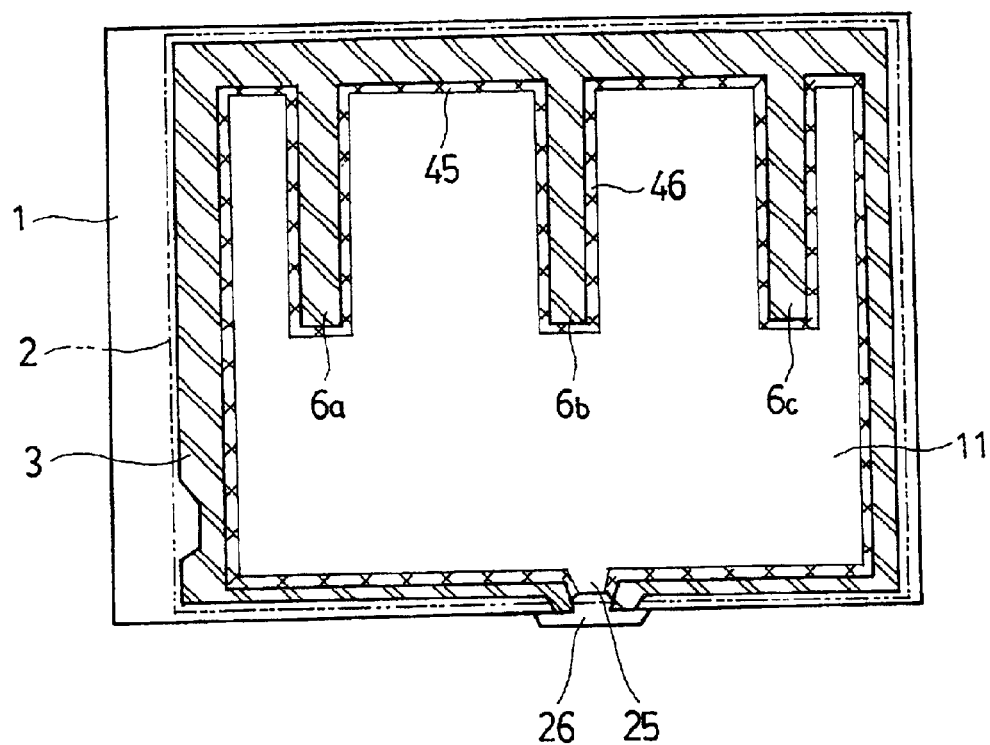

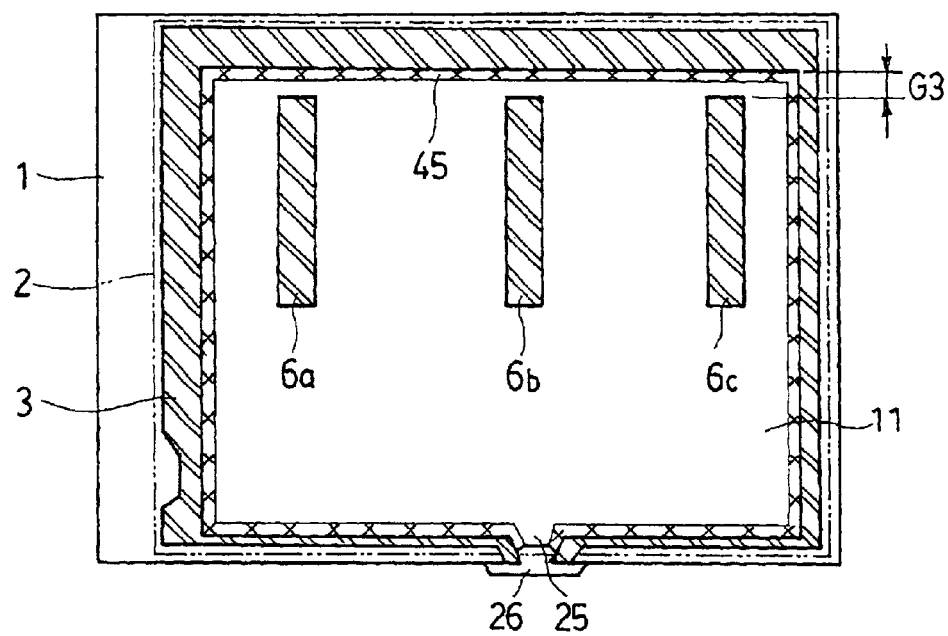
F I G. 10
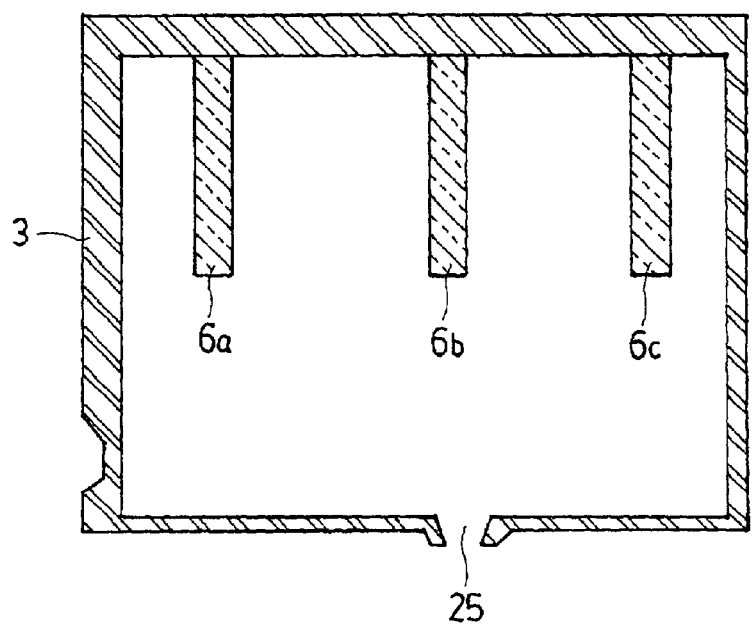
F I G. 11

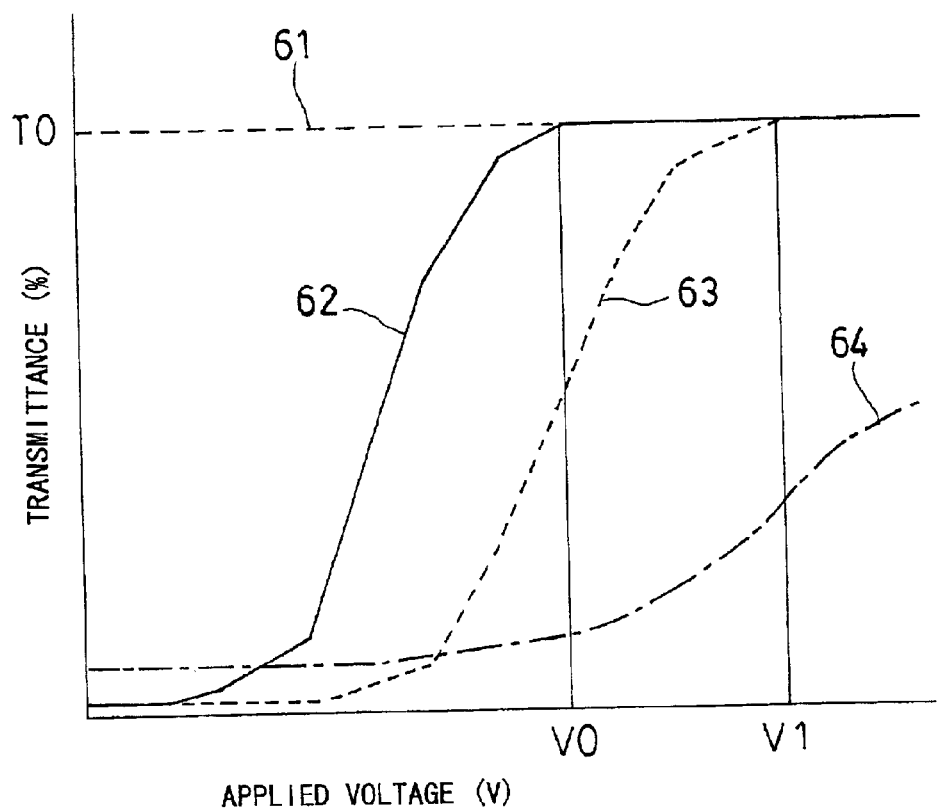
F I G. 1 2

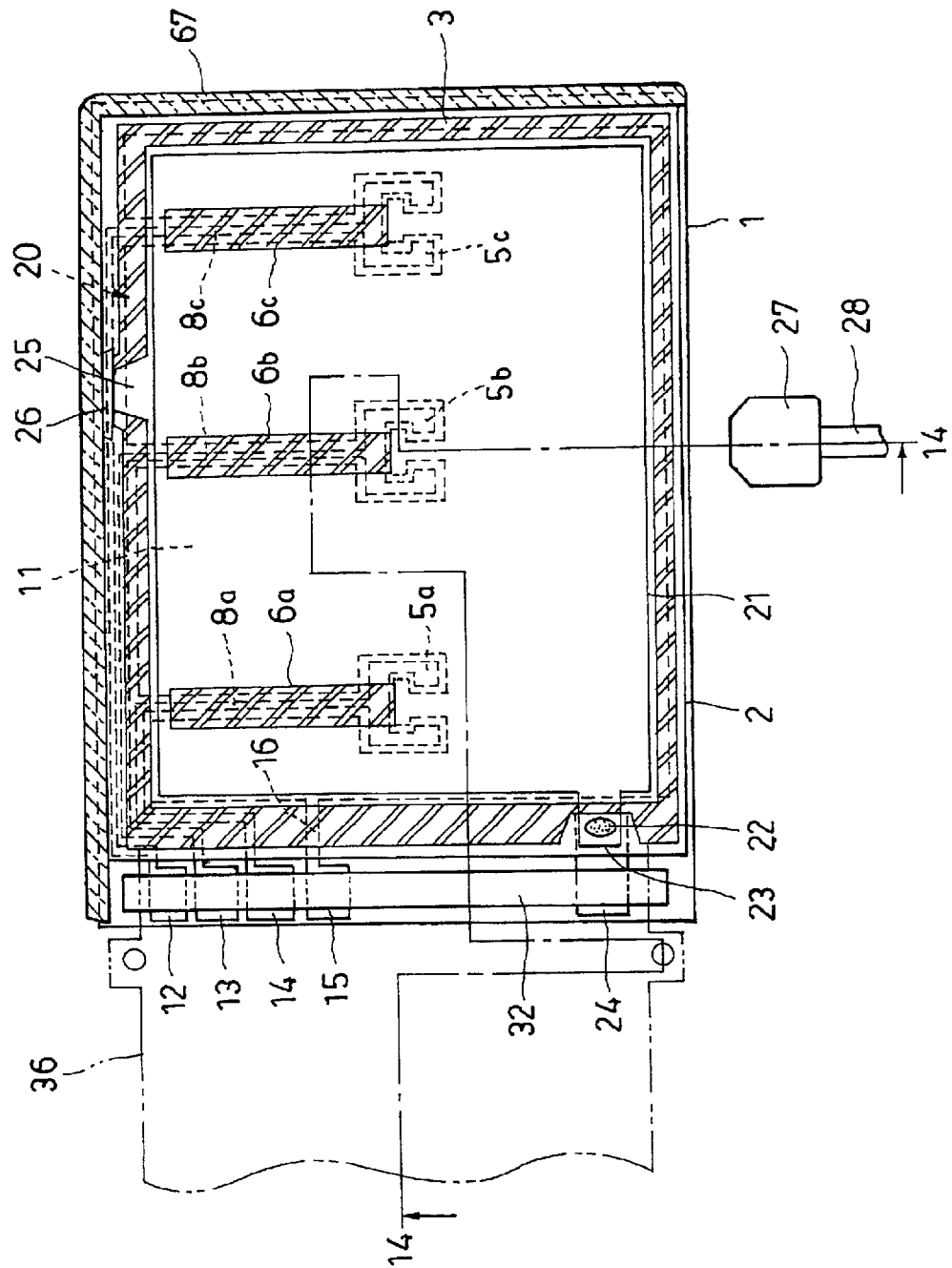

LIQUID CRYSTAL DISPLAY PANEL

FIELD OF THE INVENTION

The present invention relates to a liquid crystal display panel forming a part of a liquid crystal display device, and more particularly, to a liquid crystal display panel suited for displaying patterns (characters, mark graphics, and so forth) in the shape as required in cloudy white or black, or in the form of a colored pattern against a transparent background.

DESCRIPTION OF THE RELATED ART

As liquid crystal display devices, using a liquid crystal display (LCD) panel, have advantages of low-profile shape, light weight, and further, very low power consumption, these devices have come to be used as display devices for a wide variety of equipment including various kinds of portable electronic equipment such as a tabletop calculator, cellular phone, wrist watch, camera, video camera, note-type personal computer, and so forth.

With such a liquid crystal display panel, a pair of transparent substrates are bonded together by a sealing section provided on the periphery of a display region with a given spacing provided therebetween, and a liquid crystal cell is made up by sealing a liquid crystal layer in-between the spacing. By applying a voltage to parts of the liquid crystal layer via signal electrodes and opposite electrodes formed on an opposed inner face of the two substrates, respectively, optical properties (twist of a polarization axis, birefringence, transmission/scattering, and so on) of the liquid crystal layer can be varied.

Accordingly, through a combination of a polarizing film disposed on both sides of the liquid crystal cell or by the use of the liquid crystal cell itself, parts of the liquid crystal layer where a voltage is applied come to differ from parts of the liquid crystal layer where no voltage is applied, in terms of transmission/absorption or scattering of light, or hue of light, thereby enabling a variety of displays to be effected.

Consequently, with this type of liquid crystal display panel, parts where the respective signal electrodes formed on one of the substrates are opposed to (or cross in the case of a dot-matrix type liquid crystal display panel) the respective opposite electrodes formed on the other of the substrates, with the liquid crystal layer interposed therebetween, perform functions of display portions (pixels).

In order to enable each of the display portions (pixels) to be driven independently, it is necessary to provide the periphery of the respective display portions with a gap where no electrode is installed.

For this reason, in the case of a liquid crystal display panel using, for example, twisted nematic (TN) liquid crystal in a liquid crystal layer, it has been possible to effect consistent display across the entire area of a display region in a condition wherein no voltage is applied to the liquid crystal layer, but impossible to do so in a condition wherein a voltage is applied thereto because the voltage cannot be applied to regions of the gaps where no electrode has been installed.

Further, in the case of a liquid crystal display panel for selectively displaying isolated patterns against a background in consistent display, there is a need of forming wiring electrodes for use in applying a voltage to electrodes constituting respective isolated pattern display portions, in such a way as to cross electrodes in a background region while providing a gap between the electrodes and the wiring electrodes. As with the case of the signal electrodes and the opposite electrodes, the wiring electrodes are formed of a transparent ant electrically conductive film, such as an indium tin oxide (ITO) film.

However, if, for effecting display at any of the pattern display portions, a voltage is intended to be applied to a signal electrode and an opposite electrode for the relevant pattern display portion, this will cause a problem that, because the voltage is applied via a wiring at connected to the signal electrode, the voltage will be applied to a portion of the liquid crystal layer between the wiring electrode and the opposite electrode as well, so that a region of the wiring electrode as well as the relevant pattern display portion is turned into a display state.

Accordingly, the wiring electrodes are rendered very thin in width so as to be inconspicuous. However, if the same are rendered too thin, this will increase electrical resistance, causing a problem of poor responsivity in display.

Also, in the case of a liquid crystal display panel for use in a viewfinder of a camera, and the like, it is important from the viewpoint of enhanced visibility from a viewer to have an even display across the entire area of a display region, and to have a transmittance as high as possible, except for necessary patterns such as a target pattern for auto focus, and the like.

In order to attain a high transmittance, a liquid crystal display panel using a liquid crystal layer capable of obtaining a high contrast ratio without use of polarizing films is promising.

For example, a liquid crystal display panel using a scattering-type liquid crystal layer with transparent solids made of organic polymers diffused in liquid crystal is in a milky white state causing incident light to scatter when no voltage is applied to the liquid crystal layer, but is turned into a transparent state having a high transmittance when a voltage is applied thereto.

It follows therefore that for effecting display only at necessary display portions such as a target pattern for auto focus, and the like, against a transparent background, no voltage may be applied to the liquid crystal layer only at display portions to be displayed while a voltage is applied to the entire region of the liquid crystal layer, other than regions of the display portions to be displayed.

However, when no voltage is applied to electrodes at the display portions, no voltage is applied to wiring electrodes connected thereto either, and consequently, no voltage is applied to a portion of the liquid crystal layer interposed between the wiring electrodes and the opposite electrodes, so that the portion of that liquid crystal layer is not turned into a transparent state. Consequently, it follows that the entire region of the liquid crystal layer, other than the regions of the necessary display portions, cannot be rendered transparent.

The present invention has been developed to solve such problems as described in the foregoing, and it is therefore an object of the invention to provide a liquid crystal display panel capable of displaying isolated patterns against a transparent background, wherein a consistently transparent state can be attained with ease across the entire area of a display region, other than regions of necessary pattern display portions, in a condition where a voltage is applied to a liquid crystal layer in a background region.

SUMMARY OF THE INVENTION

To attain the object as described above, a liquid crystal display panel according to the present invention is as follows.

A first substrate with signal electrodes formed on a face thereof is bonded to a second substrate with an opposite electrode formed on a face thereof at a given spacing provided by a peripheral sealing section interposed therebetween on the periphery of a display region such that the signal electrodes are opposed the opposite electrode, and a liquid crystal layer is installed in between the spacing.

The signal electrodes include a peripheral electrode formed substantially across the entire area of the display region, pattern electrodes formed in isolation within the peripheral electrode, and wiring electrodes formed across the peripheral electrode with a gap provided between the same and the peripheral electrode for selectively applying a voltage to the respective pattern electrodes.

The opposite electrode is installed over the entire area of the display region in such a way as to oppose the signal electrode.

With the liquid crystal display panel, the first substrate, second substrate, signal electrodes and opposite electrode are all transparent, the liquid crystal layer undergoes changes in optical properties depending on whether or not a voltage is applied between the signal electrodes and the opposite electrode, and a transmittance of portions of the liquid crystal layer, where a voltage is applied, increases.

Further, with the liquid crystal display panel, wiring sealing sections formed of a transparent sealing material are installed in the display region between the wiring electrodes and the opposite electrode such that portions of the display region where the wiring sealing sections are installed always have a transmittance substantially equal to that of portions of the liquid crystal layer where a voltage is applied.

A first substrate with signal electrodes formed on a face thereof is bonded to a second substrate with an opposite electrode formed on a face thereof at a given spacing provided by a peripheral sealing section interposed therebetween on the periphery of a display region such that the signal electrodes are opposed the opposite electrode, and a liquid crystal layer is installed in between the spacing.

The signal electrodes include a peripheral electrode formed substantially across the entire area of the display region, pattern electrodes formed in isolation within the peripheral electrode, and wiring electrodes formed across the peripheral electrode with a gap provided between the same and the peripheral electrode for selectively applying a voltage to the respective pattern electrodes.

According to the present invention, the wiring sealing sections formed of the transparent sealing maternal, instead of the liquid crystal layer, are installed between the wiring electrodes and the opposite electrode, and optical properties of the wiring sealing sections are rendered equal to those of the liquid layer where a voltage has been applied, whereby a transmitted of the portions of the liquid crystal layer in a condition where the voltage has been applied becomes substantially equal to that of the wiring sealing sections, so that quasi-consistent display can be attained across the entire area of the display region.

In the case of using scattering liquid crystal layer composed of mixed liquid crystal comprised of liquid crystal and transparent solids as the liquid crystal layer, with a scattering type liquid crystal layer to which a transparent state occurs by applying a voltage thereto, by installing the wiring sealing sections which are transparent in gaps between the wiring electrodes and the peripheral electrode as well, a substantially uniform transmittance can be obtained with ease over the entire area of the display region as a result of a transparent state of the liquid crystal layer and transparency of the wiring sealing sections, in a condition where a voltage is applied to the liquid crystal layer. Further, by installing a sealing section formed of the same transparent sealing material as a transparent sealing material for the wiring sealing sections in gaps between the respective pattern electrodes and the peripheral electrode as well, a more uniform transmittance can be obtained over the entire area of the display region.

Furthermore, if the wiring sealing sections installed in the display region are isolated by separating the same from the peripheral sealing section installed on the periphery of the display region, thermal contraction and thermal expansion occurring to the periphery of the substrates are first absorbed by the peripheral sealing section even in case that rapid changes in temperature occurs to an application environment of the liquid crystal display panel, and consequently, thermal contraction and thermal expansion propagated to the wiring sealing sections are mitigated.

In particular, in the case of using the scattering type liquid crystal layer for the liquid crystal layer, the structure of the transparent solids is broken down when subjected to rapid changes in temperature, and as a result, there arises a risk that regions where a transparent state does not occur even when a voltage is applied will occur to the periphery of the wiring sealing sections. However, by installing the wiring sealing sections in isolation as described above, thereby mitigating effects of thermal contraction and thermal expansion, it is possible to prevent occurrence of unevenness in display of the liquid crystal layer, thus effectively contributing to implementation of consistent transmissive display over the entire area of the display region.

Further, for the peripheral sealing section, a sealing having high reliability is adopted in order to protect the liquid crystal layer from the application environment of the liquid crystal display panel. However, for the wiring sealing sections for which transparency is particularly important, a material lower in hardness and softer (more elastic) than a material used for the peripheral sealing section, such as a resin not prone to accumulation of stress, is preferably used so as to reduce stress on the liquid crystal layer as much as possible against changes in temperature of the liquid crystal display panel.

Furthermore, in the case of the scattering type liquid crystal layer, the transparent solids are formed in the liquid crystal layer by ultraviolet irradiation, thereby raising a risk of fluidity of liquid crystal being hindered due to adhesion of the transparent solids to the substrates. In such a situation, as compared with the case of liquid crystal being in liquid state, a structure of the transparent solids is susceptible to breakdown due to stress caused by the sealing sections, and once the structure is broken down, such a condition is maintained.

Accordingly, by installing an ultraviolet absorbing layer in regions in the vicinity of the peripheral sealing section and the wiring sealing sections, respectively, it becomes possible to keep the liquid crystal lying around the periphery of the sealing sections in liquid state, and to maintain fluidity thereof through absorption of ultraviolet rays irradiated when forming the transparent solids.

It is possible to employ the pattern electrodes of the signal electrode as target display portions for auto focus, in the shape of a target pattern which are installed in the viewfinder of a camera.

In such a case, if a gap in a range of 30 to 70 $\mu$m in width is formed between the respective target (pattern) electrodes and the peripheral electrode, this will allow outlines of the respective target display portions, even in a non-display state, to be dimly visible, serving the convenience of a viewer in recognizing a location thereof beforehand.

Further, at least a part of the peripheral sealing section may be rendered transparent, and a light source for emitting light to the liquid crystal layer from outside of the peripheral sealing section through a transparent part thereof may be installed.

The light source is preferably disposed at a location opposite to a shorter side of the wiring sealing sections, suited for emitting light from outside of the peripheral sealing section. Further, the light source may be a light source for emitting colored light.

Further, a convex lens or a diffusion film, for irradiating the liquid crystal layer in whole with light emitted from the light source, is preferably installed between the light source and the transparent part of the peripheral sealing section.

With the liquid crystal display panel provided with the light source as described above, because a transparent state occurs over the entire area of the display region by applying a voltage to the target electrodes and the peripheral electrode, outgoing light from the light source travels in a straight line through the liquid crystal layer, and is not sent out in a direction along which it is transmitted through the first substrate or the second substrate. By selectively stopping voltage application to the target electrodes, the light from the light source can be sent out in a direction along which it is transmitted through the first substrate or the second substrate due to the scattering property of the part of the liquid crystal layer.

Hereupon, for example, as seen by the viewer from the external side of second substrate, the light source comes out only from the a display portion corresponding to the target electrode to which no voltage is applied, but does not come out from a background region surrounding the display portion, and consequently, this is quite effective resulting from no deterioration of visibility in the case of the viewer seeing given information on the first substrate side of the liquid crystal display panel through the background region while the target pattern is displayed by the target electrode.

The light source is preferably disposed at the location opposite to the shorter side of the wiring sealing sections, suited for emitting light from outside of the peripheral sealing section. By causing the light emitted by the light source to fall on the liquid crystal layer from the peripheral part of the liquid crystal display panel, it is possible to obtain a contrast ratio between the background region displayed by the agency of the peripheral electrode, and the target display portions displayed by the agency of the target electrodes. However, there is a risk of reflection occurring at the boundary between the liquid crystal layer and the wiring sealing sections due to a slight difference in refractive index between the liquid crystal or the organic polymers, in the liquid crystal, and the wiring sealing sections with the result that a portion of the light emitted by the light source can be seen through the wiring sealing sections. For this reason, the light source is preferably disposed at the location as described above in order to obtain evenness in display of the background region.

Further, by taking advantage of scattering properties of the liquid crystal layer at the target display portions, and causing incoming light from the light source to be sent out towards the side of the viewer, it is possible to obtain a contrast ratio between the target display and information visually recognized after transmitted through the background region in a transparent state. However, if the light emitted by the light source is too intense, this will cause the pupil of the eyes of the viewer to dilate, and consequently, the viewer visually recognizes mainly the light emitted by the light source in the case where the contents of the information visually recognized after transmitted through the background region are dark, so that a recognition degree of the information as seen through the background region deteriorates. Accordingly, if visual sensitivity is utilized with the use of a light source emitting colored light, this will enable the viewer to sufficiently recognize the target display portions even though brightness of the light source is subdued.

In such a case, if a light source emitting a plurality of differently colored lights is adopted so as to enable the plurality of the colored lights to be selected, it becomes possible to further enhance visibility of the target display portions because a tone of the colored lights can be selected according to the color of information transmitted through the peripheral display region of the liquid crystal display panel.

Further, in the case of using the scattering type liquid crystal layer composed of liquid crystal and organic polymers mixed therewith as the liquid crystal layer, regions where a structure of organic polymers differs from that in other regions occur to the periphery of the sealing sections due to substantial variation in thermal effect. Accordingly, it is desirable to install an adiabatic sealant in the peripheral region of the first substrate as well as the second substrate of the liquid crystal display panel. By so doing, it becomes possible to prevent a rapid heating or cooling phenomenon from the periphery of the liquid crystal display panel from taking place.

Further, by coloring the adiabatic sealant, it is also possible to prevent the light emitted from the light source from being reflected from the periphery of the liquid display panel. In particular, it is preferable to color the adiabatic sealant so as to render the same to double as a light absorption layer capable of absorbing light in color of the emitted light of the light source. Further, the adiabatic sealant may be colored black, thereby absorbing light at all wavelengths in the visible range.

BRIEF DESCRIPTION OF THE DRAWINGS

FIG. 6 is a plan view of the second substrate shown in FIG. 1 with an opposite electrode formed on the underside face thereof.

FIG. 9 is a plan view showing the condition of defects respectively occurring to the peripheral sealing section and the wiring sealing sections of the liquid crystal display panel.

FIG. 10 is a plan view similar to FIG. 9, showing a modification example of the wiring sealing sections for preventing defects from occurring to the periphery thereof.

FIG. 11 is a plan, view of the peripheral sealing section and the wiring sealing sections only, similar to FIG. 10, showing another modification example.

FIG. 12 is a graph showing variation of a transmittance in relation to a voltage applied to respective parts of the liquid crystal display panel according to the invention.

FIG. 13 is a plan view of a liquid crystal display panel according to a second embodiment of the invention.

DETAILED DESCRIPTION OF THE PREFERRED EMBODIMENTS

Preferred embodiments of a liquid crystal display panel according to the invention are described hereinafter with reference to the accompanying drawings.

First Embodiment: FIGS. 1 to 12

First, a first embodiment of a liquid crystal display panel according to the invention and partly modification examples thereof are described with reference to FIGS. 1 to 12.

Figure 1:
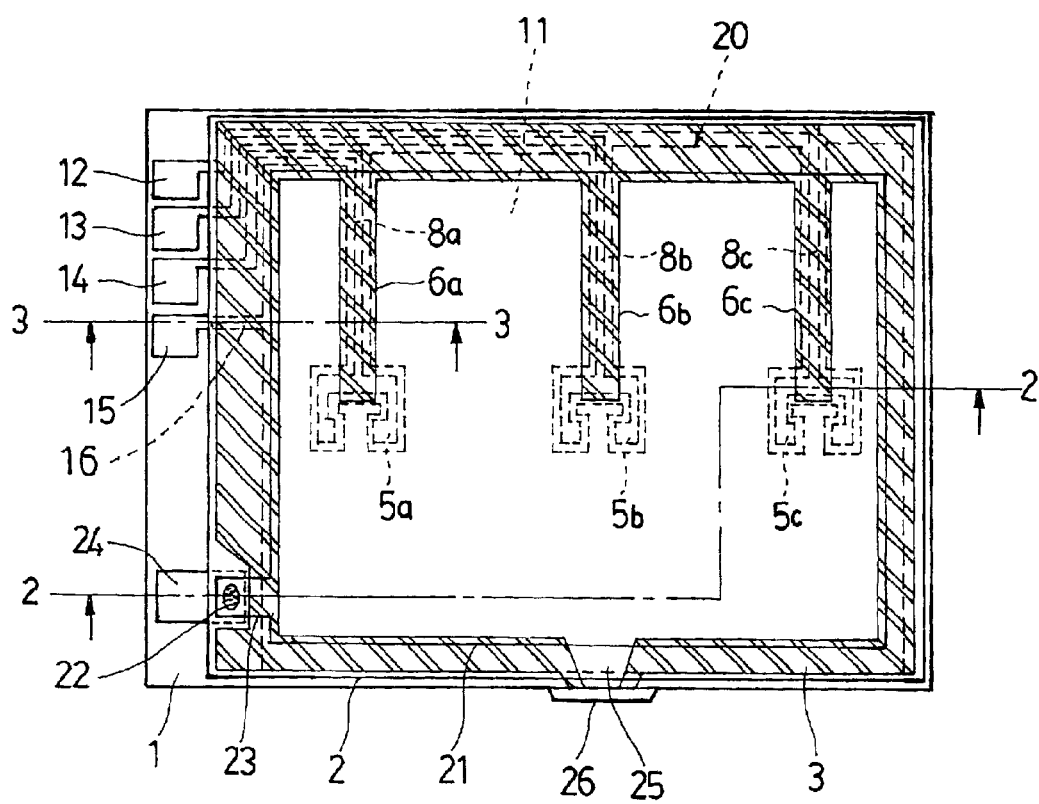
FIG. 1 is a plan view showing a portion constituting a liquid crystal cell of a liquid crystal display panel according to a first embodiment of the invention.
Figure 2:
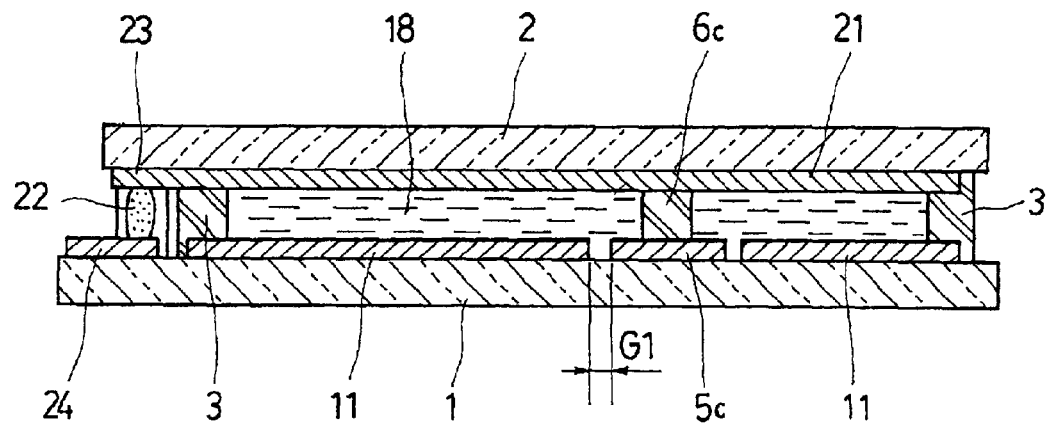
FIG. 2 is a sectional view taken along line 2—2 in FIG. 1.
Figure 3:
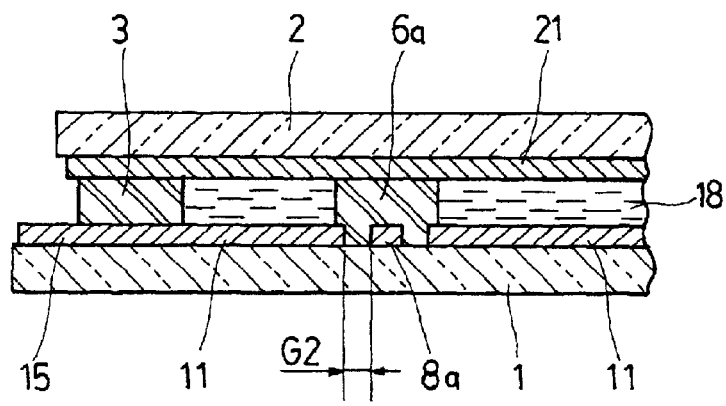
FIG. 3 is a sectional view taken along line 3—3 in FIG. 1.

FIG. 1 is a plan view showing a portion constituting a liquid crystal cell of the liquid crystal display panel according to the first embodiment. FIGS. 2 and 3 are sectional views taken along line 2—2 and line 3—3 in FIG. 1, respectively. This embodiment shows an example wherein the liquid crystal display panel is used as a module to be assembled in a finder of a camera.

As shown in FIGS. 1 to 3, with the liquid crystal display panel, a first substrate 1 with signal electrodes 20 formed on a face thereof, and a second substrate 2 with an opposite electrode 21 formed on a face thereof are bonded together at a given spacing with a peripheral sealing section 3 interposed therebetween on the periphery of a display region such that the signal electrodes 20 are opposed to the opposite electrode 21, and a liquid crystal layer 18 is sealed in-between the spacing.

The signal electrodes 20 comprise a peripheral electrode 11 formed substantially over the entire area of a display region, target electrodes 5a, 5b, 5c which are pattern electrodes formed in isolation within the peripheral electrode 11, and wiring electrodes 8a, 8b, 8c, formed across the peripheral electrode 11 with a gap provided between the same and the peripheral electrode 11, respectively, for selectively applying a voltage to the respective target electrodes.

The opposite electrode 21 is installed over the entire area of the display region in such a way as to oppose the signal electrode 20.

Figure 4:
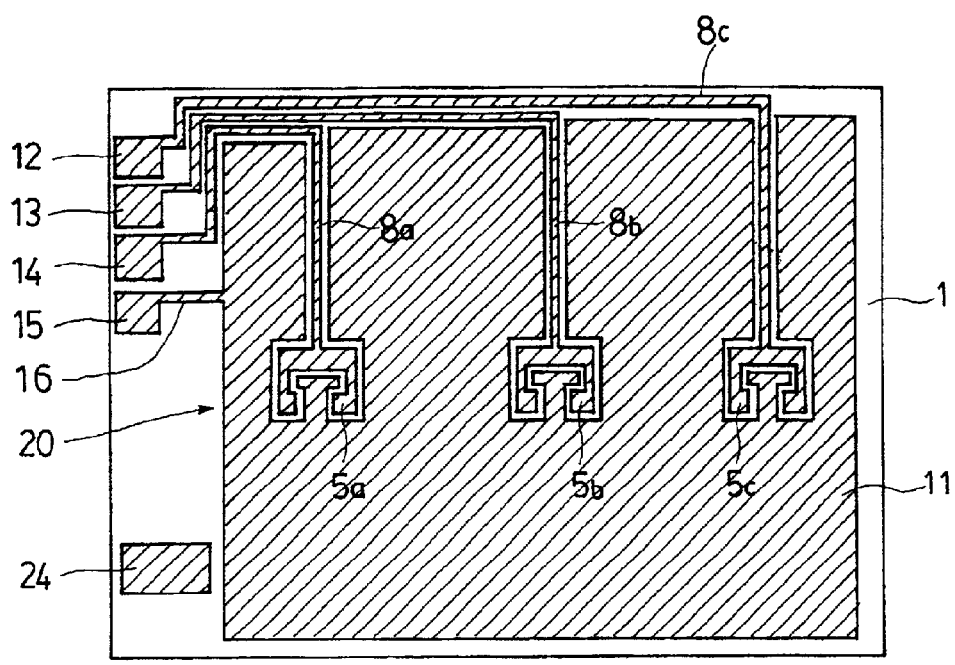
FIG. 4 is a plan view of a first substrate shown in FIG. 1 with signal electrodes formed on the top face thereof.
Figure 5:
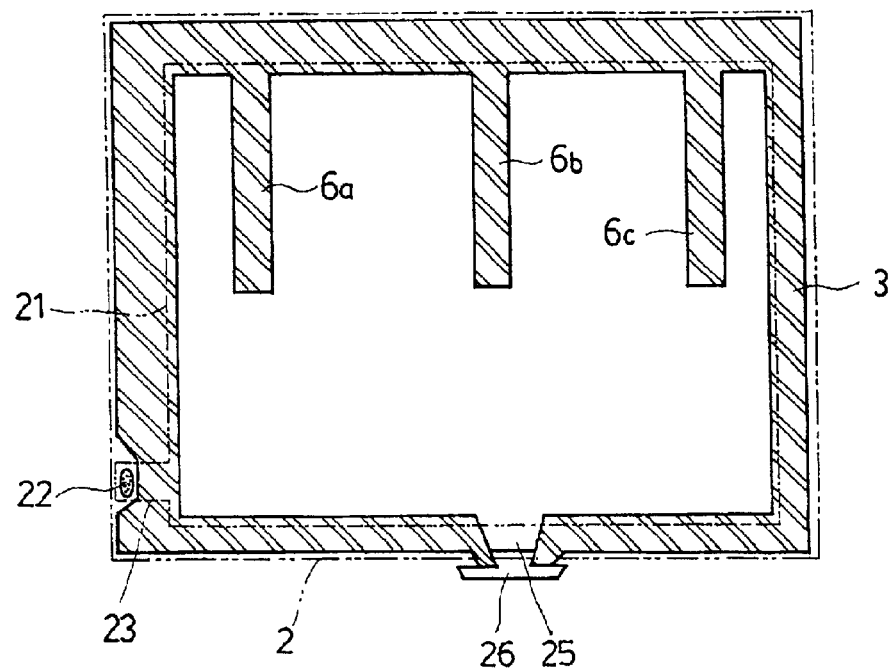
FIG. 5 is a plan view of a peripheral sealing section and wiring sealing sections installed between the first substrate and a second substrate shown in FIG. 1.

FIGS. 4 to 6 are views showing more clearly the constitution of the first substrate, the sealing sections, and the second substrate, respectively, as shown in FIG. 1.

The first substrate is a transparent glass substrate, and as shown in FIG. 4, on a face (in the figure, the top face) thereof, there are provided the peripheral electrode 11 formed substantially over the entire area of the display region, three portions of the target electrodes 5a, 5b, 5c formed in isolation within the peripheral electrode 11 in the shape of a target pattern for auto focus, and the wiring electrode 8a, 8b, 8c respectively connected to the target electrodes 5a, 5b, 5c, all of which serve together as the signal electrodes 20 made up of an indium tin oxide (ITO) film which is a transparent and electrically conductive film.

On the surface of the first substrate, and in the vicinity of the edge along one of the sides thereof, three connecting electrodes 12, 13, 14 for the target electrodes, respectively, and a connecting electrode 15 for the peripheral electrode, are installed in line. Furthermore, a connecting electrode 24 for the opposite electrode formed on the second substrate is installed on the first substrate as well. All these connecting electrodes are formed of the same ITO film as the ITO film used for the signal electrodes 20.

The three portions of the target electrodes 5a, 5b, 5c are connected to the respective connecting electrodes 12, 13, 14 via the wiring electrodes 8a, 8b, 8c, respectively, crossing the peripheral electrode 11, and the peripheral electrode 11 is connected to the connecting electrode 15 for the peripheral electrode via a wiring electrode 16 for the peripheral electrode.

As shown in FIGS. 2 and 3, gaps G1, G2 are provided between the peripheral electrode 11 and the respective target electrodes 5a, 5b, 5c, and between the peripheral electrode 11 and the respective wiring electrodes 8a, 8b, 8c, respectively. The gaps are preferably rendered smaller in width because of inconspicuousness. However, a width of 10 micrometers (mm) or more is required to ensure sufficient insulation, and the width in the order of 20 mm is preferable. A width of the wiring electrodes 8a, 8b, 8c is preferably rendered to be in a range of 10 to 20 mm as well so as to prevent electric resistance thereof from becoming too large even if the thickness thereof is thin.

The second substrate 2, which is opposed to the first substrate 1 with the spacing in a range of 7 to 10 micrometers (mm) provided therebetween is a transparent glass substrate as well, and as shown in FIG. 6, on a face (in the figure, the underside face) thereof, the opposite electrode 21 made up of an ITO film is formed over the entire area of the display region. A wiring electrode 23 is formed for the opposite electrode as well.

In order to cause the first substrate 1 to oppose the second substrate 2 with the given spacing provided therebetween, a plastic spacer (not shown) is interposed in the spacing, and as shown in FIGS. 2 and 3, the first substrate 1 and the second substrate 2 are bonded together with the peripheral sealing section 3 made up of a transparent sealing material provided on the periphery of the display region, as clearly shown in FIG. 5.

As a result, the respective target electrodes 5a, 5b, 5c and the peripheral electrode 11 disposed on the first substrate 1 are opposed to the opposite electrode 21 disposed on the second substrate 2 with a predetermined spacing provided therebetween.

The peripheral sealing section 3 is provided with a sealing hole 25 defined at a part thereof, and a liquid crystal layer 18 is sealed in a gap between the first substrate 1 and the second substrate 2 by injecting liquid crystal into the gap through the sealing hole 25, and sealing the liquid crystal with a sealing member 26.

Thus, the respective target electrodes 5a, 5b, 5c and the peripheral electrode 11 disposed on the first substrate 1, are opposed to the opposite electrode 21 disposed the second substrate 2, with the liquid crystal layer 18 sandwiched therebetween.

The present invention has sealing sections. As with the case of a conventional liquid crystal display panel, the peripheral sealing section 3 as described above has the functions of hermetically sealing the liquid crystal layer 18, bonding the first substrate 1 with the second substrate 2 while keeping the given spacing therebetween, and protecting the liquid crystal layer 18 from an ambient environment.

With the liquid crystal display panel according to the present invention, however, wiring sealing sections 6a, 6b, 6c formed of a transparent sealing material are provided between the respective wiring electrodes 8a, 8b, 8c installed for applying a predetermined voltage to the respective target electrodes 5a, 5b, 5c, and the opposite electrode 21, and also in gas between both sides of the respective wiring electrodes 8a, 8b, 8c, and the peripheral electrode 11, such that the liquid crystal layer 18 is not interposed in those regions.

With the first embodiment of the present invention, the wiring sealing sections 6a, 6b, 6c are formed of the same sealing material as a sealing material for the peripheral sealing section 3 in such a way as to be continuous with each other as shown FIG. 5.

As for the liquid crystal layer 18, a precursor for mixed liquid crystal containing organic monomers in liquid crystal is injected into a spacing between the first substrate 1 and the second substrate 2 through the sealing hole 25 of the peripheral sealing section 3, and are sealed with the sealing member 26, whereupon the organic monomers are converted into organic polymers by ultraviolet irradiation applied from the outside, thereby obtaining a scattering type liquid crystal layer 18 with transparent solids diffused in the liquid crystal.

The liquid crystal layer 18 undergoes changes in optical properties depending on whether or not a voltage is applied between the signal electrodes 20 and the opposite electrode 21, and a transmittance goes up (becomes transparent) in regions thereof where a voltage is applied. Further, regions of the liquid crystal display panel where the wiring sealing sections 6a, 6b, 6c are disposed are set to have always a transmittance substantially equal to that of regions of the liquid crystal layer 18 where a voltage is applied.

Furthermore, as clearly shown in FIG. 2, the wiring electrode 23 for the opposite electrode formed on the second substrate 2 is connected to the connecting electrode 24 for the opposite electrode formed on the first substrate 1 via an anisotropic conductive sealant 22 made of an adhesive with electrically conductive particles mixed therein. Thus, the opposite electrode 21 on the second substrate 2 can be electrically connected to the connecting electrode 24 on the first substrate 1.

Figure 7:
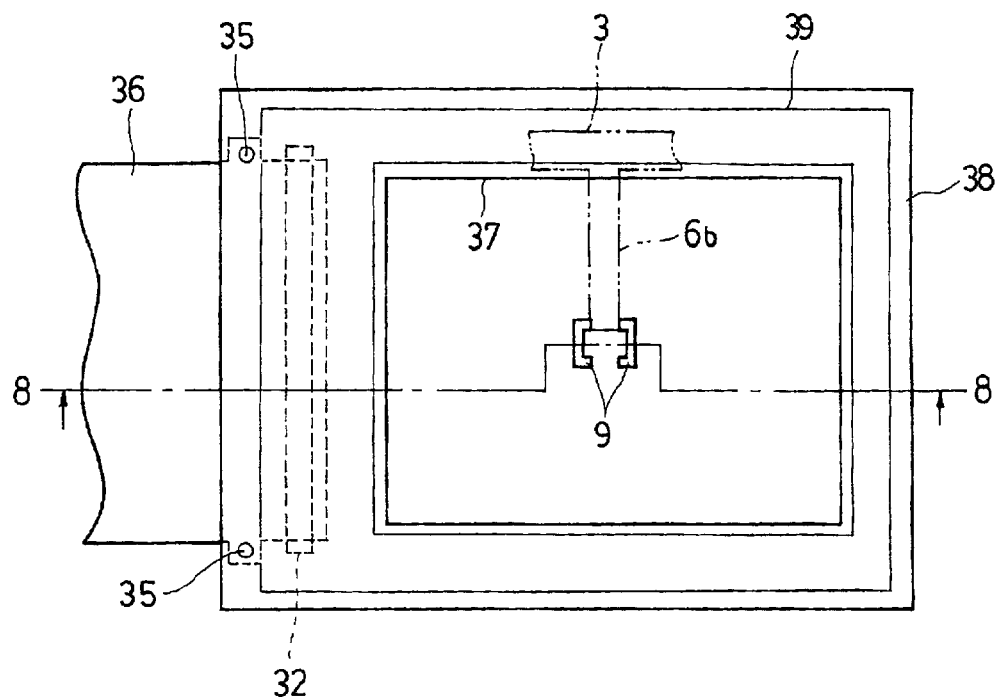
FIG. 7 is a plan view of the liquid crystal display panel according to the first embodiment, in a state displaying one target.
Figure 8:
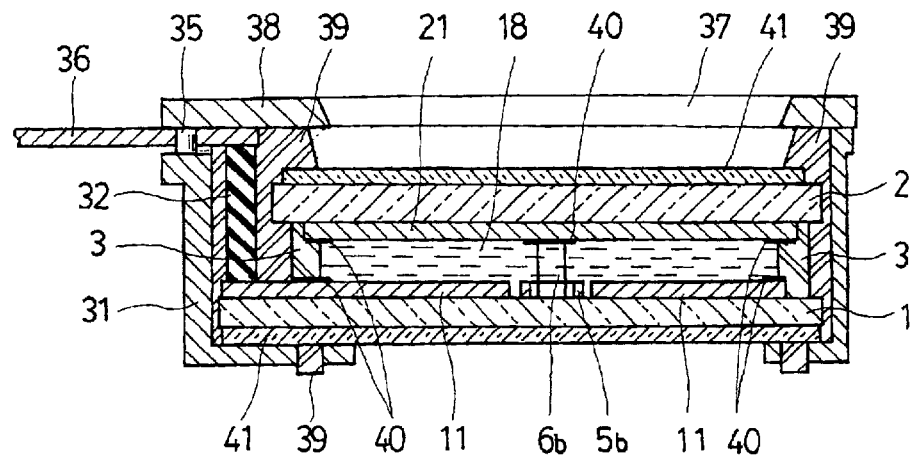
FIG. 8 is a sectional view taken along line 8—8 in FIG. 7.

FIG. 7 is a plan view of the liquid crystal display panel according to the first embodiment in a state displaying one target, and FIG. 8 is a sectional view taken along line 8—8 in FIG. 7.

As shown in these figures, the liquid crystal display panel is installed inside a panel holding frame 31, and the respective connecting electrodes 12, 13, 14, 15 and 24 on the first substrate 1 are electrically connected to respective wirings of a flexible printed circuit board (FPC) 36 via a zebra rubber 32. For positioning of the FPC 36, a positioning pin 35 is provided on the top of the panel holding frame 31.

Further, in order to ensure connection of the zebra rubber 32 with the FPC 36, a panel fixture frame 38 is installed. The panel fixture frame 38 is provided with a display window 37 in a region corresponding to the display region of the liquid crystal display panel.

Then, in order to prevent the liquid crystal display panel from undergoing a rapid change in temperature resulting from a change in circumstances, a gap between the panel holding frame 31 and the panel fixture frame 38 is filled up with an adiabatic sealant 39 made of silicone resin.

Additionally, by use of the adiabatic sealant 39, the panel holding frame 31 is fixedly attached to the panel fixture frame 38.

Upon irradiation of the liquid crystal layer 18 with light rays at a wavelength shorter than 380 nanometers (nm), the liquid crystal layer 18 becomes increasingly yellowish in color, thereby deteriorating the degree of scattering. For this reason, on the external face of the first substrate 1 as well as the second substrate 2, an ultraviolet cutoff film 41 is installed for preventing degradation of the liquid crystal layer 18 due to irradiation with light rays (ultraviolet rays) at a wavelength shorter than 380 nanometers (nm).

The ultraviolet cutoff film 41 is formed by coating a polyethylene terephthalate (PET) film as a base material with an adhesive containing an ultraviolet ray absorbing agent, and is bonded to the external face of the first substrate 1 as well as the second substrate 2.

Further, with this embodiment, as shown in FIG. 8, an ultraviolet absorbing layer 40 is installed on at least either (in the example shown in the figure, both) of the first substrate 1 and the second substrate 2, in regions extending from overlapping regions where either or both of the first substrate 1 and the second substrate 2 overlap the peripheral sealing section 3 and the wiring sealing sections 6a, 6b, 6c, respectively, towards portions of the liquid crystal layer 18 in the vicinity of the peripheral edge of the overlapping regions. The ultraviolet absorbing layer 40 is installed in order to absorb ultraviolet rays irradiated, and to keep liquid crystal around the sealing sections in liquid state, thereby maintaining fluidity, when ultraviolet irradiation is applied to the organic monomers in the liquid crystal layer 18 injected in the spacing between the first substrate 1 and the second substrate 2 and the organic monomers are converted into organic polymers, thereby forming the transparent solids.

With the liquid crystal display panel according to this embodiment, regions where the respective target electrodes 5a, 5b, 5c, and the peripheral electrode 11 composing the signal electrodes, are opposed to the opposite electrode 21 constitute display pixels, and by applying a voltage between the respective target electrodes 5a, 5b, 5c and the peripheral electrode 11 on one side, and the opposite electrode 21 on the other side, via the FPC 36, the liquid crystal layer 18, which is in a scattering state when no voltage is applied thereto, can be turned into a transparent state.

At this time, as the respective wiring electrodes 8a, 8b, 8c and the wing sealing sections 6a, 6b, 6c installed in the gaps on both sides thereof, respectively, have a transmittance substantially equal to that of the liquid crystal layer 18 which is in a transparent state, the entire area of the display region will be in a substantially uniform transparent state.

Because the gaps around the respective target electrodes 5a, 5b, 5c are not provided with a transparent sealing material, and the liquid crystal layer 18 with no voltage applied thereto is in a scattering state, outlines of the respective target electrodes are dimly visible, however, such a date is all the more desirable in the case of application as a viewfinder module of a camera because this will allow a viewer to recognize the location of a target pattern beforehand.

However, in order to render even such outlines invisible, a sealing section formed of a transparent sealing material may be installed over the gaps around the respective target electrodes 5a, 5b, 5c as well.

By stopping voltage application to any of the target electrodes 5a, 5b, 5c, a scattering state occurs only to a portion of the liquid crystal layer 18 sandwiched between the target electrode involved and the opposite electrode 21, thereby displaying the portion. In FIG. 7, voltage application to the target electrode 5b at the center is turned off, and a target display portion 9 thereof is visible.

At this time, if the liquid crystal layer 18 exists in a region between the wiring electrode 8b and the opposite electrode 21, and in a region of the gap separating the wiring electrode 8b from the peripheral electrode 11, a scattering state will occur to these regions as well, so that these regions will become visible.

With this liquid crystal display panel, however, as these regions are provided with the wiring sealing section 6b which is transparent, only the target display portion 9 for auto focus is visible, and the entire area of the display region except the target display portion 9 is in a transparent state, thus enabling the subject of a photograph within a field of view of the finder to be visually recognized with clarity through the liquid crystal display panel.

By stopping voltage application to another target electrode 5a or 5c only, the target display portion 9 becomes visually recognizable only at a location thereof.

FIG. 12 shows variation of a transmittance in relation to a voltage applied to respective parts of the liquid crystal display panel, and the horizontal axis represents applied voltage (V) while the vertical axis represents transmittance (%).

In the figure, a broken line 61 represents a transmittance T0 (always transparent) of the wiring sealing sections 6a, 6b, 6c, not dependent on applied voltage. A solid line 62 shows a transmittance of regions of the liquid crystal layer 18 where a voltage is applied, increasing according to an increase in applied voltage, and reaching the same level as that of the transmittance T0 of the wiring sealing sections at an applied voltage of V0, where the transmittance becomes saturated. A broken line 63 shows a transmittance of the liquid crystal layer in the regions of the gaps between the respective target electrodes 5a, 5b, 5c and the peripheral electrode 11, and the transmittance also undergoes a gradual increase according to an increase in applied voltage due to the effect of applied voltage on both sides of the respective gaps, reaching the transmittance T0 of the wiring sealing sections at an applied voltage of V1 (V1>V0), where the transmittance becomes saturated.

Accordingly, even if the gaps between the respective target electrodes 5a, 5b, 5c and the peripheral electrode 11 are not provided with a transparent sealing section, respectively, the liquid crystal layer in the regions of the gaps as well become transparent due to the gradient effect of an applied voltage by gradually increasing a voltage applied between those electrodes and the opposite electrode 21, so that the entire area of the display region can be turned into a consistently transparent state.

When the liquid crystal display panel as described in the foregoing is subjected to rapid changes in temperature, peripheral sealing section defects 45 and wiring sealing section defects 46 where an increase in transmittance does not take place even if a voltage applied to the liquid crystal layer 18 is increased will occur to the periphery of the peripheral sealing section 3 and the wiring sealing sections 6a, 6b, 6c, respectively, as shown in FIG. 9.

As indicated by a chain line 64 in FIG. 12, in regions of the liquid crystal layer 18 where the defects 45, 46 have occurred, a transmittance does not go up to a sufficiently high level in spite of an increase in applied voltage, and consequently, a transparent state cannot occur thereto.

These defects occur particularly in the course of a rapid cooling treatment, and in the case of rapid cooling at a temperature gradient of 1° C./sec or more. Further, the defects are prone to occur if a difference in temperature reaches around 50° C. at the time of rapid cooling.

For this reason, with the liquid crystal display panel as shown in FIGS. 7 and 8, the gap between the panel holding frame 31 and the panel fixture frame 38 is filled up with the adiabatic sealant 39 made of silicone resin. Also, the panel holding frame 31 is fixedly attached to the panel fixture frame 38 with the adiabatic sealant 39.

Thus, by providing the adiabatic sealant 39 in the periphery of the first substrate 1 as well as the second substrate 2, the interior of the liquid crystal display panel can be prevented from undergoing rapid cooling even if a change in temperature occurs due to the effect of an ambient environment, so that the risk of the defects occurring to the periphery of the peripheral sealing section 3 and the wiring sealing sections 6a, 6b, 6c is eliminated, thereby preventing occurrence of inferior display.

Modification Example 1

The inferior display caused by the defects occurring to the liquid crystal layer 18 as described in the foregoing can be veiled by a parting film, or the like, if the defects occur in the vicinity of the inner edge of the peripheral sealing section 3. However, defects, if any, occurring to the periphery of respective wiring sealing sections 6a, 6b, 6c, can not be veiled.

Accordingly, as shown in FIG. 10, a predetermined gap is preferably provided between a peripheral sealing section 3 and the respective wiring sealing sections 6a, 6b, 6c such that the respective wiring sealing sections 6a, 6b, 6c are formed in the pattern of an island.

For example, a gap G3 of 2 millimeters (mm) in width is provided between the peripheral sealing section 3 and the respective wiring sealing sections 6a, 6b, 6c.

A liquid crystal display panel according to a modification example 1, in other respects, is the same as that for the liquid crystal display panel according to the first embodiment, and therefore, a description thereof is omitted. In FIG. 10, parts corresponding to those in FIGS. 1 to 9 are denoted by like reference numerals for convenience in description.

With the constitution as described above, in case that rapid cooling of the liquid crystal display panel occurs due to a drop in temperature of an ambient environment, a defect 45 occurs to a liquid crystal layer 18 in the vicinity of the inner edge of the peripheral sealing section 3 resulting from thermal conduction and thermal contraction thereof, however, since the respective wiring sealing sections 6a, 6b, 6c are formed in the pattern of an island away from the peripheral sealing section 3, the thermal conduction is blocked, and thermal contraction reacts to the periphery of the respective wiring sealing sections 6a, 6b, 6c, thus hardly causing defects to occur to the periphery thereof.

In contrast with the case where the peripheral sealing section 3 and the wiring sealing sections 6a, 6b, 6c are formed in continuation with each other, defects do not occur to the periphery of the wiring sealing sections even if a difference in temperature during rapid cooling is greater by 10 to 20° C., thereby enabling display quality to be maintained in good condition.

Modification Example 2

FIG. 11 shows another example of a liquid crystal display panel devised for preventing defects from occurring to the periphery of wiring sealing sections. In FIG. 11 as well, parts corresponding to those in FIGS. 1 to 9 are denoted by like reference numerals for convenience in description.

In this example, a peripheral sealing section 3 is formed of a sealing material different from that for wiring sealing sections 6a, 6b, 6c. That is, the wiring sealing sect 6a, 6b, 6c are formed of a sealing material lower in hardness, and softer (greater in elastic coefficient) than that for the peripheral sealing section 3.

As described hereinbefore, the peripheral sealing section 3 has functions of hermetically sealing a liquid crystal layer, keeping a given spacing between a first substrate and a second substrate, and protecting the liquid crystal layer from an ambient environment, and accordingly, an epoxy resin based adhesive with moderate hardness is used as the sealing material thereof.

For the respective wiring sealing sections 6a, 6b, 6c, a rubber based transparent adhesive is used. With the use of the rubber based adhesive, elasticity of the wiring sealing sections is provided, and degradation in orientation of the liquid crystal layer can be prevent in spite of rapid changes in temperature of the liquid crystal display panel. Further, as the epoxy resin based adhesive is used for the peripheral sealing section 3, the liquid crystal layer 18 can be protected from degradation due to changes in humidity and other reasons.

With the example shown in FIG. 11, two kinds of sealing materials are in contact with each other outside a display region, however, gaps may be provided between both the sealing sections such that the respective wiring sealing sections 6a, 6b, 6c are formed in the pattern of an island, respectively.

With such a constitution, even when the liquid crystal display panel is subjected to rapid cooling, defects are rendered hard to occur in the periphery of the respective wiring sealing sections 6a, 6b, 6c made of the rubber based adhesive having elasticity and heat insulation property, thereby enabling display quality to be maintained in good condition.

Figure 14:
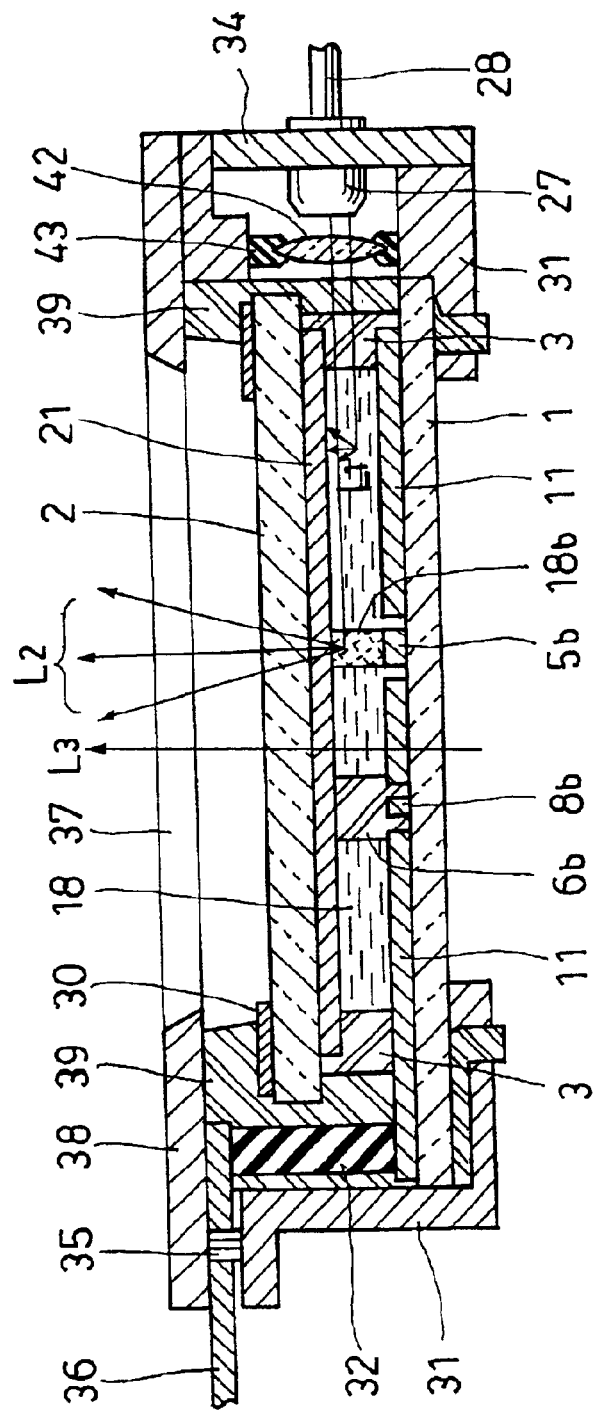
FIG. 14 is a sectional view taken along line 14—14 in FIG. 13.
Figure 15:
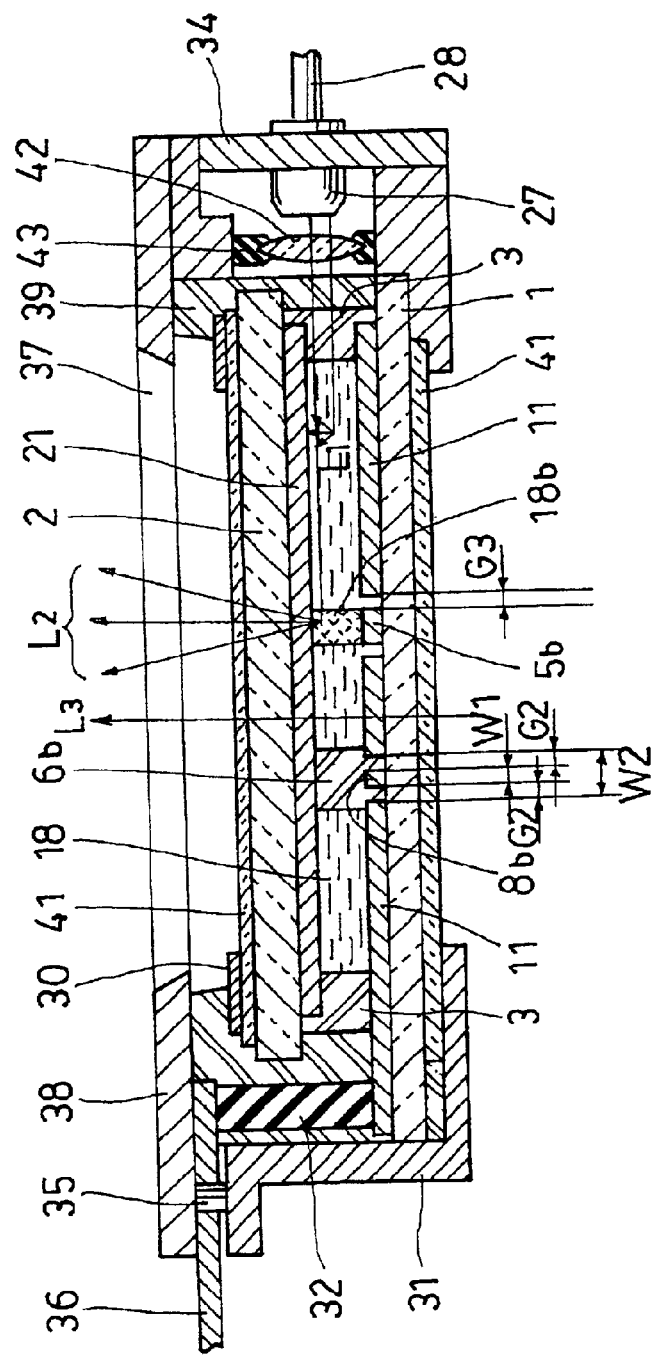
FIG. 15 is a sectional view similar to FIG. 14, showing another example with addition of an ultraviolet cutoff film.

Second Embodiment: FIGS. 13 to 15

Subsequently, a second embodiment of a liquid crystal display panel according to the invention, and a modification example thereof are, described with reference to FIGS. 13 to 15. In the figures as well, parts corresponding to those of the first embodiment, shown in FIGS. 1 to 11, are denoted by like reference numerals, and description thereof is omitted or simplified.

FIG. 13 is a plan view similar to FIG. 1 showing the second embodiment of the liquid crystal display panel according to the invention, and FIG. 14 is a sectional view taken along line 14—14 in FIG. 13, showing different cross sections thereof in the same plane.

The liquid crystal display panel according to the second embodiment is also a case wherein the present invention is applied to a liquid crystal display module used for a viewfinder of a camera, in which the liquid crystal display panel is provided with a light source causing light to fall on a liquid crystal layer from a side face of the liquid crystal display panel.

With this liquid crystal display panel as well, on a first substrate 1, there are installed three portions of target electrodes 5a, 5b, 5c, wiring electrodes 8a, 8b, 8c, which are formed within a display region so as to be connected to the target electrodes 5a, 5b, 5c, respectively, and a peripheral electrode 11 formed substantially over the entire area of the display region in such a way as to surround those electrodes described all of which are made up of an ITO film, that is, a transparent and electrically conductive film, and function as signal electrodes.

Further, on a second substrate 2 opposed to the first substrate 1 with a predetermined spacing provided therebetween, an opposite electrode 21 is formed over the entire area of the display region.

The first substrate 1 and the second substrate 2 are opposed to each other with the predetermined spacing provided therebetween, and are bonded together with a plastic spacer (not shown) and a peripheral sealing section 3 having a sealing hole 25 defined at a part thereof, interposed therebetween.

Wiring sealing sections 6a, 6b, 6c made of a transparent sealing material are installed in a spacing between the respective wiring electrodes 8a, 8b, 8c and the opposite electrode 21, and also in gaps between the respective wiring electrodes 8a, 8b, 8c and the peripheral electrode 11, in such a way as to be formed in the pattern of an island, respectively, away from the peripheral sealing section 3 with a slight spacing provided therebetween, in the same way as shown in FIG. 10. In this case, a sealing material used for the wiring sealing sections 6a, 6b, 6c may be either the same kind of material as that used for the peripheral sealing section 3 or a sealing material of different quality. However, use of a sealing material lower in hardness, and softer than the sealing material used for the peripheral sealing section 3 is more effective from the viewpoint of preventing defects of a liquid crystal layer 18 from occurring to the periphery of the wiring sealing sections 6a, 6b, 6c at the time of rapid cooling.

As with the case of the first embodiment, for the liquid crystal layer 18, use is made of a scattering type liquid crystal layer composed of liquid crystal and transparent solids obtained by converting organic monomers mixed in the liquid crystal into organic polymers through ultraviolet irradiation. Because such a liquid crystal layer as described has no orientation when no voltage is applied thereto, the same exhibits scattering properties as slight and numerous reflections are repeated between the liquid crystal and the organic polymers. When a voltage is applied orientation of the liquid crystal layer is enhanced, and further, difference in refractive index between the liquid crystal and the organic polymers is almost eliminated, so that scattering of light does not occur, and a transparent state occurs to the liquid crystal layer.

Further, the respective wiring sealing sections 6a, 6b, 6c always have a transmittance substantially equal to that of portions of the liquid crystal layer 18 where a voltage is applied, regardless of whether or not a voltage is applied thereto.

With such a constitution, display of nothing but a target pattern within a transparent background can be effected by any of the target electrodes 5a, 5b, 5c.

As shown in FIG. 14, incident light rays L3 from the subject of a photograph positioned an the underside (the lens side) of the first substrate 1 and falling on regions of the liquid crystal layer where a voltage is applied, are recognized as bright since the liquid crystal layer 18 is in a transparent state. However, when no voltage is applied to the target electrode 5b, a portion of the liquid crystal layer 18b corresponding thereto is in a scattering state, and is visually recognized as dark by a viewer because incident light rays from the subject of the photograph and falling thereon, if any, are barely transmitted therethrough.

Accordingly, it follows that, as seen by the viewer, display of nothing but the target pattern in a dark state within a frame of the subject of the photograph the substantially entire area of which is bright, is effected by the target electrode 5b.

However, in case that the incident light rays falling from the subject of the photograph are dark, the viewer find it difficult to recognize the target pattern.

Accordingly, with this embodiment, a light source 27 made up of a light-emitting diode (LED) device emitting red light is installed on the periphery of the liquid crystal display panel. A wiring 28 for applying a predetermined light emission signal is connected to the light source 27.

As shown in FIG. 14, the light source 27 is fitted into, and held by a light source holding member 34 so as to be securely attached to a panel holding frame 31.

As at least a part of an adiabatic sealant 39 as well as the peripheral sealing section 3 facing the light source 27 is transparent, and light outgoing from the light source 27 is transmitted through a transparent part thereof, and falls into the liquid crystal layer 18 sandwiched between the first substrate 1 and the second substrate 2.

As shown in FIG. 14, a convex lens 42 (omitted in FIG. 13) is disposed between the light source 27 and the adiabatic sealant 39 for irradiating the liquid crystal layer 18 in whole with light emitted from the light source 27, and the convex lens 42 is held to the panel holding frame 31 through the intermediary of a lens holding member 43. However, a similar effect can be obtained by disposing a diffuser in place of the convex lens 42.

Further, with this embodiment, the light source 27 is disposed outside of a side of the peripheral sealing section 3 opposite to a shorter side of the respective wiring sealing sections 6a, 6b, 6c. As a result, even if there occurs a slight difference in refractive index between the liquid crystal layer 18 and the wiring sealing sections 6a, 6b, 6c, it is possible to minimize reflection at the interface between the liquid crystal layer 18 and the wiring sealing sections. However, the light source 27 may also be disposed so as to face another direction through suitable selection of the liquid crystal layer 18 as well as a sealing material composing the wiring sealing sections.

As shown in FIG. 14, light outgoing from the light source 27 is turned into light slanted at a predetermined angle by the agency of the convex lens 42, and falls on a side face of the first substrate 1, the second substrate 2, and the liquid crystal layer 18 making up the liquid crystal display panel. Such incoming light is subjected to repeated internal reflection caused by a difference in refractive index between an air layer, and the first substrate 1 or the second substrate 2, and consequently, the light can enter throughout the liquid crystal layer 18.

In FIG. 14, incoming light rays L1 are shown as light components directly entering the liquid crystal layer 18. Scattered light rays L2 show light components outgoing from the light source 27 and falling on a scattering part 18b (a portion corresponding to the tart electrode 5b to which no voltage is applied) of the liquid crystal layer 18, then outgoing again to the side of a viewer after undergoing scattering. Because the incoming light rays L1 undergo only slight scattering at the transparent part of the liquid crystal layer 18, the same hardly exit to the side of the viewer. However, because light components falling on the scattering part 18b of the liquid crystal layer 18 undergo scattering, and exit to the side of the viewer, the target pattern can be seen in a bright state even in the case where it is dark on the side of the subject of the photograph.

Further, by installing the transparent wiring sealing sections 6a, 6b, 6c over the wiring electrodes 8a, 8b, 8c and in the gaps provided on both sides thereof where a predetermined voltage can not be applied to the liquid crystal layer 18 in the display region of the liquid crystal display panel, and by rendering a transmittance of the wiring sealing sections 6a, 6b, 6c large and substantially equal to that of the liquid crystal layer 18 when a voltage is applied, it becomes possible to irradiate the entire region of the liquid crystal layer 18 with light emitted by the light source 27 disposed in the transverse direction of the liquid crystal layer 18 without causing attenuation of the light.

By installing the peripheral electrode 11 on the periphery of the respective target electrodes 5a, 5b, 5c, and by causing a transparent state to occur to a substantially entire area of the display region, the entire region of the liquid crystal layer 18 can be illuminated. Accordingly, even if the liquid crystal layer 18 is irradiated with the outgoing light of the light source 27 emitted from the transverse direction of the liquid crystal layer 18 in the case that the peripheral electrode 11 is not installed and the liquid crystal layer 18 is in a scattering state, the outgoing light is subjected to attenuation resulting from scattering thereof in the liquid crystal layer 18, thereby causing non-uniformity in illumination to occur in the display region.

Further, as shown in FIG. 14, in order to prevent rapid cooling of the liquid crystal display panel due to environmental changes, the adiabatic sealant 39 is installed on the periphery of the liquid crystal display panel, and a parting film 30 for defining the display region is disposed on the upper face of the first substrate 1.

Furthermore, an anti-reflection layer 67 is installed on the peripheral face of sides of the first substrate 1 and the second substrate 2, other than the side thereof provided with the light source 27. By the agency of the anti-reflection layer 67, it is possible to prevent light emitted by the light source 27 from being unnecessary reflected by the panel holding frame 31 towards the interior of the display region, and particularly, to prevent the light from unnecessarily outgoing to the side of the viewer. As a result, a contrast ratio between the target pattern and a background display can be increased, thereby improving visibility.

Modification Example

A modification example wherein the liquid crystal display panel according to the second embodiment of the present invention is partially modified is described hereinafter with reference to FIG. 15. FIG. 15 is a sectional view of the modification example similar to FIG. 14.

This liquid crystal display panel differs from the liquid crystal display panel shown in FIGS. 13 and 14 only in that an ultraviolet cutoff film 41 is installed on the external face of the first substrate 1 and the second substrate 2, respectively.

With these liquid crystal display panels, the smaller the width of a gap G3 formed between a target electrode 5b (the same applies to 5a and 5c) and a peripheral electrode 11 is, the easier a transparent state can be caused to occur over the entire display region. However, in order to enable a viewer to recognize beforehand a location of a target pattern for auto focus, it is preferable that the target pattern can be dimly seen, and accordingly, the width of the gap G3 has been preferably in a range of 30 to 70 $\mu$m.

Further, the peripheral electrode 11 is installed also on the periphery of a wiring electrode 8b (the same applies to 8a and 8c), connected to the target electrode 5b, and the wiring electrode 8b is electrically insulated from the peripheral electrode 11 by gaps G2 formed on both sides of the wiring electrode 8b. A width of the gaps G2 is 5 μm, and a width W1 of the wiring electrode 8b (the same applies to 8a and 8c) is 5 μm. With the width of the gaps G2 and the width W1 of the wiring electrode 8b at 2 μm or more, respectively, the gaps G2 and the wiring electrode 8b can function without any problem, but become susceptible to static electricity if the respective widths are less than 2 μm.

Also, from the viewpoint of achieving control and positioning accuracy with respect to the width of a wiring sealing section 6b covering over the wiring electrode 8b and the gap G2 on both sides thereof and partially overlapped by the peripheral electrode 11, it is desirable that the wiring electrode 8b and the gap G2 on both sides thereof are 2 μm or more in width, respectively. These widths have served useful functions even at 10 μm, respectively, by slightly easing up uniformity between the wiring sealing section 6b and a liquid crystal layer 18. The sum of the width W1 of the wiring electrode 8b and double the width of the gap G2 on both sides thereof represents a target routing width W2 within which the target is routed, and the width W2 has been considered to be preferably 6 μm or more.

By rendering the width W1 of the wiring electrodes 8a, 8b, 8c and the width of the gap G2 on both sides thereof 10 μm or less, respectively, and by rendering the target routing width W2 or the width of the wiring sealing sections 6a, 6b, 6c 30 μm or less, visibility as seen by a viewer can be sufficiently lowered. By rendering the target routing width W2 or the width of the wiring sealing sections 6 μm or less, visibility can be further lowered. However, taking into consideration alignment of the wiring sealing sections with regions where the respective targets arm routed, or an increase in electric resistance within the respective wiring electrodes, and incidence of wiring breakage, the width in a range of 6 to 30 μm is preferable.

Further, with the liquid crystal display panel shown in FIG. 15, the ultraviolet cutoff film 41 is installed on the surface of the first substrate 1 as well as the second substrate 2, on a side thereof opposite from the liquid crystal layer 18, for preventing irradiation of the liquid crystal layer 18 with ultraviolet rays. For ordinary application, the liquid crystal display panel without the ultraviolet cutoff film 41 presents no problem in respect of reliability. However, in the case where light from the subject of a photograph emitting ultraviolet rays arrives at the liquid crystal display panel for a long duration, the ultraviolet cutoff film 41 serves useful functions. In addition, an anti-reflection coating (not shown) is installed on top of the ultraviolet cutoff film 41. With the anti-reflection coating installed, it becomes possible to prevent occurrence of shadows, and so forth, caused by reflected light from the liquid crystal display panel being reflected off other components.

Even if brightness of a light source 27 is subdued, it is possible to enable the viewer to sufficiently recognize target display portions by taking advantage of visual sensitivity with the use of a light source emitting colored light as the light source 27. Further, by use of a light source (or a plurality of light sources) emitting a plurality of differently colored lights (for example, in red, blue, and green) as the light source 27 to enable selection of the plurality of the colored lights, it becomes possible to further enhance visibility of the target pattern through selection of hue of the colored lights according to a color of a background transmitted through a peripheral display region of the liquid crystal display panel.

Furthermore, in order to prevent defective regions where the structure of organic polymers differs from that in other regions from occurring to portions of the liquid crystal layer on the periphery of the sealing sections due to rapid changes in temperature in an ambient environment, an adiabatic sealant 39 is installed in the peripheral region of the first substrate 1 as well as the second substrate 2.

By coloring portions of the adiabatic sealant 39 on sides other than a side where the light source 27 is disposed in such a way as to double as a light absorption layer, it becomes possible to prevent light entering the liquid crystal display panel from the light source 27 from being reflected from a panel holding frame 31, and so forth, disposed outside of the liquid crystal display panel. In particular, it is preferable to color the adiabatic sealant 39 so as to absorb light in color of the emitted light of the light source 27, and the adiabatic sealant 39 may be colored in black absorbing light at all wavelengths in the visible range.

By installing an anti-reflection film on the surface of at least either one of the first substrate 1 and the second substrate 2 of the liquid crystal display panel, it is possible to prevent multiple reflections from occurring between the liquid crystal display panel and a component installed on the top side and the underside thereof, respectively. The anti-reflection film may be in the form of a film, and by use thereof combined with the ultraviolet cutoff film 41, it is possible to prevent coloring of the liquid crystal layer due to ultraviolet irradiation, or degradation in transmittance dependency on applied voltage.

As described hereinbefore, the embodiments of the present invention as applied to a liquid crystal display module installed in a finder of a camera are described, however, the scope of the invention is not limited thereto, and the invention is applicable to a liquid crystal display panel in various usage. In such cases, a display pattern may be in the form of various characters, signs, graphics, and so on, and the target pattern represents merely an example.

Pattern electrodes functioning as the signal electrodes may be formed in a shape corresponding to the display pattern.

Further, although description is made of an example wherein the scattering type liquid crystal layer is used as the liquid crystal layer, other kinds of liquid crystal layers may be used. For example, the present invention is applicable to a liquid crystal display panel made up of a liquid crystal layer using twisted nematic liquid crystal or supertwisted nematic liquid crystal, in combination with polarizing films. However, even in such a case, the polarizing films need to be disposed such that a transparent state occurs to the liquid crystal layer when a voltage is applied thereto. In this case, however, a scope of application is limited because a transmittance in a transparent state deteriorates.

INDUSTRIAL APPLICABILITY

As is evident from the foregoing description, according to the present invention, with a liquid crystal display panel capable of displaying isolated patterns within a transparent background, in a condition wherein a voltage is applied to a background region of a liquid crystal layer, the entire area of a display region, other than a necessary pattern display, can be turned into a consistent transparent state.

Thus, there can be provided a liquid crystal display panel suited for visually recognizing information on the back side thereof, overlapped with the necessary pattern display, through a background display region.

What is claimed is:

1. A liquid crystal display panel fabricated by bonding a first substrate with a signal electrode formed on a face thereof to a second substrate with an opposite electrode formed on a face thereof at a given spacing provided by a peripheral sealing section interposed therebetween on the periphery of a display region such that the signal electrode is opposed to the opposite electrode, and by installing a liquid crystal layer in between the spacing, said signal electrode comprising:

a peripheral electrode formed substantially over the entire area of the display region;

pattern electrodes formed in isolation within the peripheral electrode; and wiring electrodes formed across the peripheral electrode with a gap provided between the same and the peripheral electrode for selectively applying a voltage to the respective pattern electrodes, wherein said opposite electrode is installed over the entire area of the display region in such a way as to oppose the signal electrode, wherein said liquid crystal layer undergoes changes in optical properties depending on whether or not a voltage is applied between the signal electrode and the opposite electrode, wherein wiring sealing sections formed of a transparent sealing material are installed between the wiring electrodes and the opposite electrode in the display region such that portions of the display region where the wiring sealing sections are installed always have a transmittance substantially equal to that of portions of the liquid crystal layer where a voltage is applied, and wherein the wiring sealing sections are formed so as to be separated from the peripheral sealing section.

2. A liquid crystal display panel according to claim 1, where the liquid crystal layer is a scattering type liquid crystal layer comprising liquid crystal and transparent solids composed of organic polymers.

3. A liquid crystal display panel according to claim 1, wherein an ultraviolet absorbing layer is installed on at least either of the first substrate and the second substrate, in regions extending from overlapping regions where either or both of the first substrate and the second substrate overlap the peripheral sealing section and the wiring sealing sections, respectively, towards portions of the liquid crystal layer in the vicinity of the peripheral edge of the overlapping regions.

4. A liquid crystal display panel fabricated by bonding a first substrate with a signal electrode formed on a face thereof to a second substrate with an opposite electrode formed on a face thereof at a given spacing provided by a peripheral sealing section interposed therebetween on the periphery of a display region such that the signal electrode is opposed to the opposite electrode, and by installing a liquid crystal layer in between the spacing, said signal electrode comprising:

a peripheral electrode formed substantially over the entire area of the display region;

pattern electrodes formed in isolation within the peripheral electrode; and wiring electrodes formed across the peripheral electrode with a gap provided between the same and the peripheral electrode for selectively applying a voltage to the respective pattern electrodes, wherein said opposite electrode is installed over the entire area of the display region in such a way as to oppose the signal electrode, wherein said liquid crystal layer undergoes changes in optical properties depending on whether or not a voltage is applied between the signal electrode and the opposite electrode, wherein wiring sealing sections formed of a transparent sealing material are installed between the wiring electrodes and the opposite electrode in the display region such that portions of the display region where the wiring sealing sections are installed always have a transmittance substantially equal to that of portions of the liquid crystal layer where a voltage is applied, and wherein the wiring sealing sections are formed of a sealing material which is lower in hardness and softer than a sealing material for the peripheral sealing section.

5. A liquid crystal display panel according to claim 4, where the liquid crystal layer is a scattering type liquid crystal layer comprising liquid crystal and transparent solids composed of organic polymers.

6. A liquid crystal display panel according to claim 4, wherein an ultraviolet absorbing layer is installed on at least either of the first substrate and the second substrate, in regions extending from overlapping regions where either or both of the first substrate and the second substrate overlap the peripheral sealing section and the wiring sealing sections, respectively, towards portions of the liquid crystal layer in the vicinity of the peripheral edge of the overlapping regions.

7. A liquid crystal display panel fabricated by bonding a first substrate with a signal electrode formed on a face thereof to a second substrate with an opposite electrode formed on a face thereof at a given spacing provided by a peripheral sealing section interposed therebetween on the periphery of a display region such that the signal electrode is opposed to the opposite electrode, and by installing a liquid crystal layer in between the spacing, said signal electrode comprising:

peripheral electrode formed substantially over the entire area of the display region;

pattern electrodes formed in isolation within the peripheral electrode; and wiring electrodes formed across the peripheral electrode with a gap provided between the same and the peripheral electrode for selectively applying a voltage to the respective pattern electrodes, wherein said opposite electrode is installed over the entire area of the display region in such a way as to oppose the signal electrode, wherein said liquid crystal layer undergoes changes in optical properties depending on whether or not a voltage is applied between the signal electrode and the opposite electrode, wherein wiring sealing sections formed of a transparent sealing material are installed between the wiring electrodes and the opposite electrode in the display region such that portions of the display region where the wiring sealing sections are installed always have a transmittance substantially equal to that of portions of the liquid crystal layer where a voltage is applied, and wherein the liquid crystal layer is a scattering type liquid crystal layer comprising liquid crystal and transparent solids composed of organic polymers and an ultraviolet absorbing layer is installed on at least either of the first substrate and the second substrate, in regions extending from overlapping regions where either or both of the first substrate and the second substrate overlap the peripheral sealing section and the wiring sealing sections, respectively, towards portions of the liquid crystal layer in the vicinity of the peripheral edge of the overlapping regions.

8. A liquid crystal display panel fabricated by bonding a first substrate with a signal electrode formed on a face thereof to a second substrate with an opposite electrode formed on a face thereof at a given spacing provided by a peripheral sealing section interposed therebetween on the periphery of a display region such that the signal electrode is opposed to the opposite electrode, and by installing a liquid crystal layer in between the spacing, said signal electrode comprising:

a peripheral electrode formed substantially over the entire area of the display region;

pattern electrodes formed in isolation within the peripheral electrode; and wiring electrodes formed across the peripheral electrode with a gap provided between the same and the peripheral electrode for selectively applying a voltage to the respective pattern electrodes, wherein said opposite electrode is installed over the entire area of the display region in such a way as to oppose the signal electrode, wherein said liquid crystal layer undergoes changes in optical properties depending on whether or not a voltage is applied between the signal electrode and the opposite electrode, wherein wiring sealing sections formed of a transparent sealing material are installed between the wiring electrodes and the opposite electrode in the display region such that portions of the display region where the wiring sealing sections are installed always have a transmittance substantially equal to that of portions of the liquid crystal layer where a voltage is applied, and wherein the pattern electrodes are target electrodes for auto focus in the shape of a target pattern which are installed in the finder of a camera, the liquid crystal layer is a scattering type liquid crystal layer comprising liquid crystal and transparent solids composed of organic polymers, and when a voltage is applied between the peripheral electrode of the signal electrode and between the target electrodes, and the opposite electrode, the entire area of the display region including the wiring sealing sections is turned into a transparent state having an identical transmittance, and only a region of a target electrode among the target electrodes where a voltage is selectively not applied or a voltage applied is reduced is turned into an opaque state due to scattering of light in the liquid crystal layer.

9. A liquid crystal display panel according to claim 8, wherein the wiring sealing sections are provided over the gaps between the wiring electrodes and the peripheral electrode of the signal electrode as well.

10. A liquid crystal display panel according to claim 8, wherein the wiring sealing sections are formed of the same sealing material as a sealing material used for the peripheral sealing section so as to be continuous with each other.

11. A liquid crystal display panel according to claim 8, wherein the wiring sealing sections are formed so as to be separated from the peripheral sealing section.

12. A liquid crystal display panel according to claim 8, wherein the wiring sealing sections are formed of a sealing material which is lower in hardness and softer than a sealing material for the peripheral sealing section.

13. A liquid crystal display panel according to claim 8, wherein an ultraviolet absorbing layer is installed on at least either of the first substrate and the second substrate, in regions extending from overlapping regions where either or both of the first substrate and second substrate overlap the peripheral sealing section and the wiring sealing sections, respectively, towards portions of the liquid crystal layer in the vicinity of the peripheral edge of the overlapping regions.

14. A liquid crystal display panel according to claim 8, wherein at least a part of the peripheral sealing section is transparent, and a light source for emitting light to the liquid crystal layer from outside of the peripheral sealing section through the transparent part thereof is installed.

15. A liquid crystal display panel according to claim 14, wherein the light source is disposed at a location opposite to a shorter side of the wiring sealing sections, suited for emitting light from outside of the peripheral sealing section.

16. A liquid crystal display panel according to claim 14, wherein the light source is a light source for emitting colored light.

17. A liquid crystal display panel according to claim 14, wherein a width of gaps between the target electrodes and the peripheral electrode is in a range of 30 to 70 μm.

18. A liquid crystal display panel according to claim 14, wherein an adiabatic sealant is provided in the peripheral region of the first substrate and the second substrate.

19. A liquid crystal display panel according to claim 18, wherein portions of the adiabatic sealant other than a portion thereof on a side where the light source is disposed double as a light absorption layer for absorbing light in color of light emitted by the light source.

20. A liquid crystal display panel according to claim 14, wherein a convex lens or a diffuser, for irradiating the liquid crystal layer in whole with light emitted from the light source, is installed between the light source and the transparent part of the peripheral sealing section.

* * * * *